Patented Aug. 23, 1949

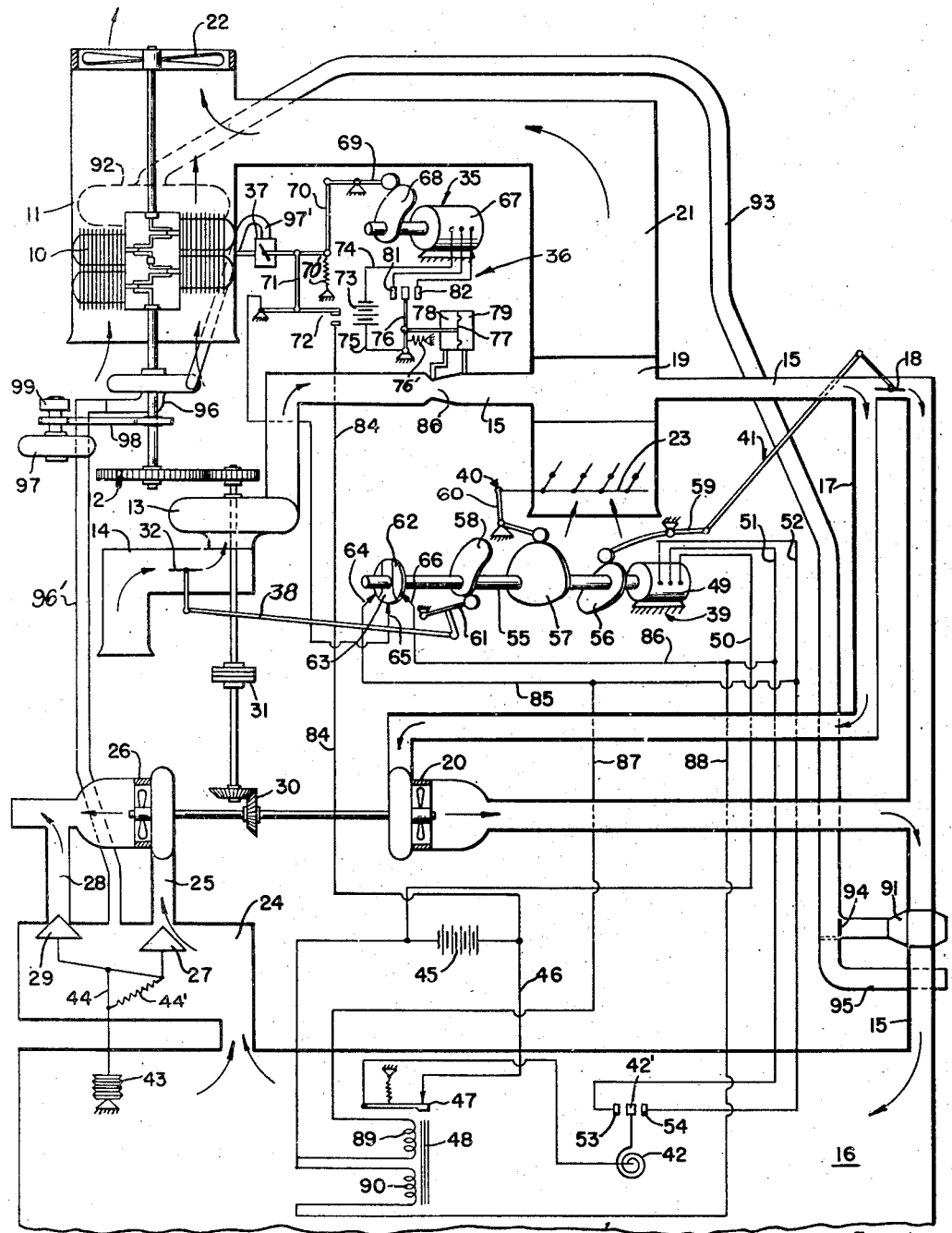

2,479,991

UNITED STATES PATENT OFFICE 2,479,991

AIRCRAFT COOLING BY AIR-DRIVEN TURBINE MEANS

Homer J. Wood, Los Angeles, Calif., assignor to The Garrett Corporation, Airesearch Manufacturing Company Division, Los Angeles, Calif., a corporation of California Application September 5, 1944, Serial No. 552,743

19 Claims. (Cl. 62—6)

This invention relates to means for air conditioning the cabins of aircraft and relates in particular to an air conditioning system especially suitable for use on large aircraft.

It is an object of the invention to provide a means for conditioning the air of an aircraft cabin in efficient and practical manner without interference with the operation of the engine used to propel the aircraft by power demand on such propelling engine.

It is an object of the invention to provide an air conditioning system of this character which has marked flexibility of control and therefore will supply air to the cabin in a manner to meet the requirements of various conditions encountered. For example, an aircraft cabin while it is standing on a landing field or is flying at low level has air requirements considerably different from those requirements which must be met when the aircraft is flying at high altitude. Under the first condition, it may be necessary to cool the air which enters the cabin, and under the second, it may be necessary to heat the air which is forced into the cabin under considerable pressure to maintain pressure in the cabin. In my present invention I provide a cooperation of parts and controls therefor by which the requirements of different conditions may be readily met.

It is an object of the invention to provide an air supply system for an aircraft cabin having a compressor for delivering air into the cabin and a source of power separate from the propelling power source of the aircraft for driving the compressor and at the same time driving a fan device for moving a flow of air to accomplish cooling of the engine which forms the separate source of power and for cooling the air which passes toward and into the aircraft cabin, as may be required by temperature conditions. This system also has means for cooling the air, or a desired part thereof, which is fed into the cabin, by absorption of energy from the potential head available in the pressurized cabin air, which power is delivered to the air compressor to assist in driving the same, thereby reducing the power demand made on the primary power source of the system. Also, it is an object of the invention to provide a system of this character wherein air is released from the cabin through a power absorbing device such as a turbine and such power is likewise fed back to the compressor to assist in driving the same. It is an object of the invention to provide a system for conditioning the air of an aircraft cabin entirely controlled by three basic control elements, one of which regulates cabin pressure through control of the outflow valve, another of which regulates the temperature of the air entering the cabin, and the last of which maintains a substantially constant flow of air into the cabin.

An object of the invention is to provide in this arrangement of cooperating parts means whereby the air delivered into the cabin may be heated as the result of a controlled operation of the compressor and a cooperative operation of the engine which drives the same.

Further objects and advantages of the invention will be brought out in the following part of the specification.

Referring to the drawing which is for illustrative purposes only,

The figure is a schematic view of the air conditioning system.

In the preferred embodiment of the invention, a power source such as an internal combustion engine 10 is located in a duct 11 suitably formed in the aircraft. This engine, through suitable transmission means 12, represented by gears, drives a compressor 13 diagrammatically shown as a blower which takes in atmospheric air through an intake duct 14 and delivers the same through inlet air duct means 15 to the interior space of the aircraft cabin 16.

I have employed the terminology "inlet air duct means" for the reason that the main duct for directing replenishment air into the cabin 16 has in association therewith or as a part thereof an air bypass 17, control valve 18, and an aftercooler 19, the bypass 17 having therein an air operated power absorbing device 20 shown as an air turbine which, by reason of its absorption of power, reduces the temperature of the air which passes therethrough. The aftercooler 19 comprises a heat exchanger disposed so that the inlet air may be passed therethrough. This aftercooler 19 is disposed in an air duct 21 which communicates with the duct 11 at a point between the engine 10 and an air circulating means shown as an axial flow fan 22. Shutter means 23 are disposed in the duct 21 to control the flow of atmospheric air through the cooling air passages of the aftercooler. The cabin 16 is provided with air outlet means 24 for controlling the discharge of air from the cabin at such rate with relation to the inflow of air into the cabin through the inlet air duct means 15 that the pressure of air within the cabin will be maintained within any desirable range of values which will usually be dictated by and predetermined for the use of the particular aircraft.

The air outlet means 24 includes an outlet passage 25 having therein an air motor 26 comprising an air turbine which is driven by the outlet air permitted to flow through the outlet passage 25 by a control valve 27. The air outlet means 24 also includes an outlet passage 28 communicating directly with the outside atmosphere and having a valve 29 for controlling the flow of air therethrough. The air driven turbines 20 and 26 are arranged so that the power generated thereby may be delivered through gearing 30 and a free-wheeling clutch 31 to the impeller of the compressor 13, to assist in driving such impeller, thereby reducing the power which must be supplied by the engine 10. The intake duct 14 of the compressor is provided with a throttle 32.

There is a control 35 for the power source 10 for causing its operation in a manner to maintain a substantially constant flow of air through the inlet duct means 15 into the cabin 16. This control which is operated in consequence of changes of flow of air through the inlet duct means 15 has an actuating connection 36 with the carburetor 37 of the engine constituting the power source 10. It will be understood that this control need not necessarily maintain the same flow of air under all conditions of flight of the aircraft, but that it will maintain the given flow prescribed for different altitudes.

The invention provides also a control 39 which is responsive to changes in temperature of the cabin air. By "cabin air" is meant either the flow of air which is passing through the inlet duct means 15 to the cabin 16, or air which has been previously fed into the cabin. Accordingly, this control 39 may have temperature responsive means in the inlet duct means 15 or in the cabin. The control 39 has means 40 for opening and closing the shutters 23, means 41 for actuating the control valve 18 and means 38 for actuating the intake throttle 32.

Through its effect on a sensitive element shown as a thermostat 42, a rise in temperature of the cabin air will result in an actuation of the control 39 to open the shutters 23 whereby cooling air is permitted to flow through the aftercooler, thereby absorbing heat from the air which is moving through the duct 15 toward the cabin 16. Also, a high temperature of cabin air will cause an actuation of the control 39 to produce an actuation of the control valve 18 through the actuating means 41 so as to direct the inflowing air, or a suitable proportion thereof, through the bypass 17, whereby this diverted air must pass through the power absorbing turbine 20, to reduce the temperature of the inflowing air and at the same time to deliver back to the compressor 13 some of the energy expended in forcing the air through the inlet duct means 15.

A drop in temperature of the cabin air below a predetermined value will result in actuation of the control 39 so as to close the shutters 23 and open the control valve 18 to full extent so that substantially no air will be diverted through the bypass 17. If this does not produce a required increase in the heat content of the air, the control 39 will move the throttle 32 toward closed position so as to restrict the effective area of the intake 14. This will reduce the flow of air delivered by the compressor and the control 35 will act in response thereto to increase the power output and speed of operation of the engine 10, whereby the compressor 13 will be driven at a higher speed to compensate for the reduction in the effective area of the air intake 14. The additional power thus applied to move a desired flow of air through the inlet 15 will add to the heating of the air so as to produce a temperature rise therein above that which is produced in the normal operation of the compressor 13.

The invention provides an aneroid 43 for the control valves 27 and 29, which aneroid 43, acting through the linkage 44, will open the valves 27 and 29 when the cabin pressure would tend to become high, for example, when the aircraft is standing upon the ground or is flying at low altitude. At this time there will be a relatively free circulation of air through the cabin. As the aircraft moves toward higher altitudes, pressure within the cabin decreases, whereupon, the aneroid 43 will first close the valve 29 in view of the action of the spring 44' to hold the valve 29 in advanced relation to the valve 27 so that the outflowing air is passed through the discharge turbine to the exterior, whereby this turbine 26 will generate power which is transmitted to the impeller of the compressor 13. Thereafter, further expansion of the aneroid will move the valve 27 toward closed position.

The moving element 42' of the thermostat 42 is connected with a source of electric current, shown as a battery 45, through a conductor 46 having therein a switch 47 adapted to be opened by magnetic means 48. The control 39 includes a reversible motor 49 connected through a conductor 50 with the battery 45, and connected through conductors 51 and 52 respectively with the contacts 53 and 54 of the thermostat 42.

The motor 49 is adapted to rotate a shaft 55 having cams 56, 57, and 58 which, when rotated, will produce movement of the lever arms 59, 60, and 61, which form part of the actuating means 41, 40, and 38 respectively. The shaft 55 also rotates a switch drum 62 having an insulator segment 63, and being engaged by brush contacts 64, 65, and 66, for a purpose which will be later explained.

The engine control 35 includes a reversible motor 67 which operates a cam 68. A cam follower 69 is connected to the throttle valve of the carburetor 37 so that clockwise movement of the cam 68 will close the throttle valve of the carburetor and counterclockwise movement of the cam 68 will move the throttle valve toward open position. The follower 69 is connected to the carburetor 37 through a linkage 70, and this linkage 70 is connected through a link 71 with a switch 72 in such manner that when the throttle valve of the carburetor 37 is fully open, the switch 72 will be closed. A compression spring 70' acts through linkage 70 to urge the throttle valve of the carburetor 37 to a closed position.

The motor 67 is connected to a power source 73 through a conductor 74. The power source 73 is connected through a conductor 75 with a switch member 76 connected to a diaphragm 77 which is disposed between chambers 78 and 79 connected respectively with spaced points of a venturi 80 in the air inlet duct 15. A reduction in air flow through the venturi 80 will result in the movement of the contact 76 into engagement with a contact 82 connected to the motor 67 so as to produce a counterclockwise rotation of the cam 68, to accomplish an opening movement of the throttle valve of the carburetor 37. An increase in airflow through the venturi 80 will produce movement of the contact 76 into engagement with a contact 81 so that the motor will be operated so as to produce a clockwise rotation of the cam 68 which will result in a reduction in the fuel supply delivered by the carburetor 37 to the engine 10. A tension spring 76' acts upon switch member 76 to urge it into engagement with the contact 82.

The switch 72 is in a circuit 84 which connects the battery 45 with the brush contact 65, and the brush contacts 64 and 66 are respectively connected by conductors 85 and 86 with the conductors 51 and 52 associated with the motor 49. The conductors 85 and 86 are connected respectively by branch conductors 87 and 88 with electromagnets 89 and 90 of the magnetic actuating means 48 of the switch 47.

Assuming that the controls are in the positions in which they are shown in the drawings, an increase in temperature in the cabin 16 will result in an actuation of the thermostat 42 so as to move its contact 42' into engagement with the contact 54, whereupon the motor 49 will be energized so as to produce clockwise rotation of the cams 56, 57, and 58. This will result in an opening movement of the shutters 23 so that the flow of air through the aftercooler 19 will be increased. If this does not accomplish the desired reduction in temperature in the cabin air, further clockwise rotation of the shaft 55 will produce a clockwise rotation of the cam 56 to such extent that it will act through the lever 59 and the actuating means 41 to close the control valve 16, whereupon the inlet air will be directed through the bypassage 17 and cooled as the result of the heat absorption accomplished by the turbine 20.

Assuming, again, that the controls are in the positions in which they are shown in the drawing, there is a reduction in the cabin air temperature so that the contact 42' of the thermostat 42 will move into engagement with the contact 53, whereupon the motor 49 will be operated in counterclockwise direction. Counterclockwise rotation of the cam 57 will accomplish a closing movement of the shutters 23, thereby decreasing the flow of cooling air through the aftercooler 19, whereupon the absorption of heat through the cabin air passing through the inlet 15 will be diminished, and an increase in the cabin air temperature will be accomplished. A further requirement for heating of the inlet air, evidenced by continued engagement of the contact 42' with the contact 53, will produce a continued counterclockwise rotation of the shaft 55 so that the cam 58 will start to close the throttle 32, thereby producing a greater load on the compressor 13, with the resultant heating of the inlet air.

During normal conditions of operation, the position of the drum 62 will be such that the brush contact 65 will remain in engagement with the insulator 63. Therefore, at this time the closing of the switch 72 will not result in a flow of electric current through the conductor means 84 to either of the brush contacts 64 or 66. It has been explained that the switch 72 is closed when the throttle valve of the carburetor 37 is fully opened and the engine 10 is operating under full power conditions. When the switch 72 is closed, the thermostat 42 can control the rotation of the shaft 55 and the cams mounted thereon only within the range predetermined by the angular dimension of the insulator 63. Should counterclockwise rotation of the shaft 55 rotate the switch drum 62 to such extent as to carry the insulator 63 out from under the brush contact 65, there will be a flow of current from the brush 65 to the brush 64 and then through the conductor 85 and its branch 87, whereupon the electro-magnet winding 89 will be energized so as to open the switch 47, thereby deenergizing the contact 42' and taking control function from the thermostat 42. At the same time current will flow from the conductor 85 through the conductor 52 to the motor 49 to produce clockwise rotation of the shaft 55, until the insulator 63 is again brought into cooperation with the brush contact 65. In a similar manner, during the time the switch 72 is closed, a clockwise rotation of the shaft 55 sufficient to cause movement of the insulator 63 out from under the brush contact 65 will result in a flow of electric current from the brush contact 65 to the brush contact 66, which current will flow through the conductor 86 and its branch 88 to energize the electro-magnetic means 90. This will result in the opening of the switch 47 so that the thermostat 42 will be no longer effective. Current will also flow through the conductor 86 and the conductor 51 to the motor 49 so that it will be actuated in counterclockwise direction, whereupon the switch drum 62 will be rotated so as to bring the insulator 63 into conjunction with the brush contact 65.

In order to provide supplemental heating during winter operations, the invention provides an exhaust heater 91 in heat exchange relation with the duct means 15 where the latter enters the cabin 16. Exhaust gases from the engine manifold 92 are delivered to the exhaust heater 91 through an exhaust tube 93. The valve 94 in the exhaust tube 93 may be positioned to divert the exhaust gases through the heater 91, or to pass them directly into the bypass portion 95 of the exhaust tube, through which they may be discharged without passing through the heater 91.

I provide suitable connections whereby the valve 94 may be operated from the cam shaft 55 in such a manner that the auxiliary heater is made operative only in the event that the temperature control continues to call for heat after each of the other heating devices has been made operative. The operating connection between the valve 94 and the cam shaft 55 may be of the same type as the connection 38 for operating the valve 32. In order to avoid confusion in the drawing, this connection is not illustrated. A compressor shown as a supercharger 96 driven by the power source 10 is provided to furnish air to the carburetor 37 through the tube 97'. The intake of the supercharger 96 is shown as connected to the cabin air outlet through a conduit 96' so that the supercharger 96 is, in effect, a second stage of the compressor 13, whereby the cabin exhaust air under pressure is thereby utilized by the second stage compressor to furnish the necessary air to the carburetor 37.

A generator 97 is also connected to the power source 10 by means of suitable drive connections 98 and a clutch 99. This generator is intended primarily for utilizing the power of the source 10 to energize the electric starters for the main aircraft engines, thereby eliminating the necessity for the use of an external power supply at the air field for starting the aircraft engines. The clutch 99 is provided in order that the generator may be disconnected after the engines have been started. The generator may also, however, be utilized as an electric current source during flight.

I claim as my invention:

1. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; air circulating means driven by said power source for producing a flow of air to cool said power source and through said aftercooler; control means responsive to changes in temperature of the cabin air to cause functioning of said aftercooler to cool the air which flows through said duct means; a power absorbing cooling means through which air flowing through said duct means to said cabin may be passed; control means responsive to changes in temperature of the cabin air for passing through said power absorbing cooling means air flowing in said inlet duct means; means for applying the power absorbed by said power absorbing cooling means to said compressor to assist in driving the same; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

2. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; air circulating means driven by said power source for producing a flow of air to cool said power source and through said aftercooler; control means responsive to changes in temperature of the cabin air to cause functioning of said aftercooler to cool the air which flows through said duct means; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

3. In an aircraft cabin air conditioning system, the combination of: a power source; inlet air duct means connected to said cabin; a compressor driven by said power source for delivering air through said duct means into said cabin; an aftercooler for cooling the flow of air which passes through said duct means into said cabin; air circulating means driven by said power source for producing a flow of air to cool said power source and through said aftercooler; control means responsive to changes in temperature of the cabin air to cause functioning of said aftercooler to cool the air which flows through said duct means; a power absorbing cooling means through which air flowing through said duct means to said cabin may be passed; control means responsive to changes in temperature of the cabin air for passing through said power absorbing cooling means air flowing in said inlet duct means; means for applying the power absorbed by said power absorbing cooling means to said compressor to assist in driving the same; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

4. In an aircraft cabin air conditioning system, the combination of: a power source; inlet air duct means connected to said cabin; a compressor driven by said power source for delivering air through said duct means into said cabin; an aftercooler for cooling the flow of air which passes through said duct means into said cabin; air circulating means driven by said power source for producing a flow of air to cool said power source and through said aftercooler; control means responsive to changes in temperature of the cabin air to cause functioning of said aftercooler to cool the air which flows through said duct means; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

5. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; a power absorbing cooling means through which air flowing through said duct means to said cabin may be passed; control means responsive to changes in temperature of the cabin air for passing through said power absorbing cooling means air flowing in said inlet duct means; means for applying the power absorbed by said power absorbing cooling means to said compressor to assist in driving the same; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

6. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

7. In an aircraft cabin air conditioning system, the combination of: a power source; inlet air duct means connected to said cabin; a compressor driven by said power source for delivering air through said duct means into said cabin at a substantially constant rate; air outlet means for said cabin including an air driven motor to receive air from said cabin, said motor having means for transmitting its power output to said compressor to assist in driving the same, said air outlet means including an air bypass for conducting air from said cabin independently of said motor; and means responsive to changes in pressure in said cabin to control the operation of said air outlet means so as to maintain a rate of discharge of air from said cabin which will keep the cabin pressure within a desired range of values.

8. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; a power absorbing cooling means through which air flowing through said duct means to said cabin may be passed; control means responsive to changes in temperature of the cabin air for passing through said power absorbing cooling means air flowing in said inlet duct means; means for applying the power absorbed by said power absorbing cooling means to said compressor to assist in driving the same; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

9. In an aircraft cabin air conditioning system, the combination of: a power source; inlet air duct means connected to said cabin; a compressor driven by said power source for delivering air through said duct means into said cabin; an aftercooler for cooling the flow of air which passes through said duct means into said cabin; a power absorbing cooling means through which air flowing through said duct means to said cabin may be passed; control means responsive to changes in temperature of the cabin air for passing through said power absorbing cooling means air flowing in said inlet duct means; means for applying the power absorbed by said power absorbing cooling means to said compressor to assist in driving the same; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

10. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

11. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; means for throttling the intake of said compressor so that it will be necessary for said power source to speed up the compressor and thereby produce a heating of the air delivered by said compressor to said duct means; air outlet means for said cabin including an air driven motor to receive air from said cabin, said motor having means for transmitting its power output to said compressor to assist in driving the same; and means responsive to changes in pressure in said cabin to control the operation of said air outlet means so as to maintain a rate of discharge of air from said cabin which will keep the cabin pressure within a desired range of values.

12. In an aircraft cabin air conditioning system, the combination of: a power source; inlet air duct means connected to said cabin; a compressor driven by said power source for delivering air through said duct means into said cabin; means for throttling the intake of said compressor so that it will be necessary for said power source to speed up the compressor and thereby produce a heating of the air delivered by said compressor to said duct means; air outlet means for said cabin including an air driven motor to receive air from said cabin, said motor having means for transmitting its power output to said compressor to assist in driving the same, said air outlet means including an air bypass for conducting air from said cabin independently of said motor; and means responsive to changes in pressure in said cabin to control the operation of said air outlet means so as to maintain a rate of discharge of air from said cabin which will keep the cabin pressure within a desired range of values.

13. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; means for throttling the intake of said compressor so that it will be necessary for said power source to speed up the compressor and thereby produce a heating of the air delivered by said compressor to said duct means; air outlet means for said cabin; and means responsive to changes in pressure in said cabin to control the operation of said air outlet means so as to maintain a rate of discharge of air from said cabin which will keep the cabin pressure within a desired range of values.

14. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; a power absorbing cooling means through which air flowing through said duct means to said cabin may be passed; a bypass around said cooling means whereby inlet air may be directed into said cabin independently of said cooling means; means for applying the power absorbed by said power absorbing cooling means to said compressor to assist in driving the same; air outlet means for said cabin; and means responsive to changes in pressure in said cabin to control the operation of said air outlet means so as to maintain a rate of discharge of air from said cabin which will keep the cabin pressure within a desired range of values.

15. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; an aftercooler for cooling the flow of air which passes through said duct means into said cabin; a power absorbing cooling means through which air flowing through said duct means to said cabin may be passed; a bypass around said cooling means whereby inlet air may be directed into said cabin independently of said cooling means; air outlet means for said cabin; and means responsive to changes in pressure in said cabin to control the operation of said air outlet means so as to maintain a rate of discharge of air from said cabin which will keep the cabin pressure within a desired range of values.

16. In an aircraft cabin air conditioning system, the combination of: a power source; inlet air duct means connected to said cabin; a compressor driven by said power source for delivering air through said duct means into said cabin; means for normally controlling the temperature of the air delivered to said cabin; supplemental means for throttling the intake of said compressor so that it will be necessary for said power source to speed up the compressor and thereby produce a heating of the air delivered by said compressor to said duct means; and means associated with said power source for increasing the speed at which said compressor is driven by said power source.

17. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; a power absorbing cooling means through which air flowing through said duct means to said cabin may be passed; a bypass around said cooling means whereby inlet air may be directed into said cabin independently of said cooling means; means for applying the power absorbed by said power absorbing cooling means to said compressor to assist in driving the same; air outlet means for said cabin; and means responsive to changes in pressure in said cabin to control the operation of said air outlet means so as to maintain a rate of discharge of air from said cabin which will keep the cabin pressure within a desired range of values.

18. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; a power absorbing cooling means through which air flowing through said duct means to said cabin may be passed; means for applying the power absorbed by said power absorbing cooling means to said compressor to assist in driving the same; air outlet means for said cabin; and means responsive to changes in pressure in said cabin to control the operation of said air outlet means so as to maintain a rate of discharge of air from said cabin which will keep the cabin pressure within a desired range of values.

19. In an aircraft cabin air conditioning system, the combination of: a power source; inlet air duct means connected to said cabin; a compressor driven by said power source for delivering air through said duct means into said cabin; means responsive to changes in flow of air into said cabin to control the power output of said power source so that a substantially constant flow of air into the cabin will be maintained; a power absorbing cooling means through which air flowing through said duct means to said cabin may be passed; air outlet means for said cabin; and means responsive to changes in pressure in said cabin to control the operation of said air outlet means so as to maintain a rate of discharge of air from said cabin which will keep the cabin pressure within a desired range of values.

HOMER J. WOOD.

REFERENCES CITED

The following references are of record in the file of this patent:

UNITED STATES PATENTS

| Number | Name | Date |
| --- | --- | --- |
| 2,046,314 | Benkly | July 7, 1936 |
| 2,234,984 | Nixon | June 2, 1942 |
| 2,293,557 | Newton | Aug. 18, 1942 |
| 2,297,495 | Pfau | Sept. 29, 1942 |
| 2,304,151 | Crawford | Dec. 8, 1942 |
| 2,328,489 | Pfau | Aug. 31, 1943 |
| 2,353,201 | Talbot | July 11, 1944 |
| 2,391,838 | Kleinhans | Dec. 25, 1945 |
| 2,405,670 | Price | Aug. 13, 1946 |
| 2,412,071 | Warner | Dec. 3, 1946 |